United States Patent
Brown

(10) Patent No.: US 9,243,589 B2
(45) Date of Patent: Jan. 26, 2016

(54) HIGH-ENTHALPY FLUID INJECTION

(71) Applicant: Jared William Brown, Broomfield, CO (US)

(72) Inventor: Jared William Brown, Broomfield, CO (US)

( * ) Notice: Subject to any disclaimer, the term of this patent is extended or adjusted under 35 U.S.C. 154(b) by 7 days.

(21) Appl. No.: 14/069,110

(22) Filed: Oct. 31, 2013

(65) Prior Publication Data

US 2014/0116374 A1    May 1, 2014

Related U.S. Application Data

(60) Provisional application No. 61/721,198, filed on Nov. 1, 2012.

(51) Int. Cl.
*F02D 19/00* (2006.01)
*F02M 25/03* (2006.01)

(52) U.S. Cl.
CPC ............. *F02M 25/03* (2013.01); *F02D 19/00* (2013.01); *Y02T 10/121* (2013.01); *Y02T 10/16* (2013.01)

(58) Field of Classification Search
CPC ...... F02M 25/03; F02M 25/025; Y02T 10/16; Y02T 10/166; Y02T 10/163
USPC ............. 123/25 C, 543; 60/599, 605.1, 605.2
See application file for complete search history.

(56) References Cited

U.S. PATENT DOCUMENTS

| | | | | |
|---|---|---|---|---|
| 6,010,544 | A * | 1/2000 | Haldeman et al. | 44/301 |
| 7,793,493 | B1 * | 9/2010 | Mcilroy | 60/315 |
| 2003/0188700 | A1 * | 10/2003 | Mitsuhashi et al. | 123/25 C |
| 2009/0031999 | A1 * | 2/2009 | Erickson | 123/563 |

* cited by examiner

*Primary Examiner* — Lindsay Low
*Assistant Examiner* — Kevin Lathers
(74) *Attorney, Agent, or Firm* — The Neudeck Law Firm, LLC

(57) ABSTRACT

Disclosed is a turbocharged internal combustion piston engine system that includes a waste-heat recovery system. The waste-heat recovery system involves injecting heated water into the cylinders during combustion to increase engine power and efficiency and to reduce emissions. The engine can be a spark or compression ignition type of engine, and can utilize fuels including but not limited to diesel, natural gas, gasoline, and ethanol. The engine also includes a turbocharger that utilizes a turbine in the exhaust gas flow to provide power to a compressor in the intake air flow to pressurize the intake air and provide additional charge flow to the engine to increase engine output.

19 Claims, 3 Drawing Sheets

HIGH-ENTHALPY FLUID INJECTION

BACKGROUND

Waste heat recovery in various types of combustion engines is a way to improve the overall efficiency of these systems. Waste heat recovery systems range from power plants that have bottoming cycles, to thermoelectric systems that generate electricity. Power plants that have bottoming cycles utilize the excess heat in the low pressure exhaust gases from the primary work generating cycle. Thermoelectric systems utilize similar waste heat sources.

On piston engines, waste heat recovery systems can consist of a closed loop Rankine Cycle. A Rankine Cycle uses the heat from the exhaust to power the cycle. These systems typically have a separate, dedicated, expander that extracts power from the working fluid and is connected to the crankshaft of the engine.

SUMMARY

An embodiment of the invention may therefore comprise a waste heat recovery system for a turbocharged engine, comprising: an internal combustion engine with one or more cylinders; a turbocharger that extracts energy from exhaust gasses of said internal combustion engine and compresses intake air of said internal combustion engine; a pump to pressurize a fluid; one or more heat exchangers to heat said fluid using waste heat from said internal combustion engine; and, one or more electronically controlled direct injectors to inject said fluid that has been pressurized and heated into at least one engine cylinder of said internal combustion engine.

An embodiment of the invention may therefore further comprise a method of recovering waste heat for a turbocharged engine, comprising: providing an internal combustion engine with one or more cylinders; providing a turbocharger that extracts energy from exhaust gasses of said internal combustion engine and compresses intake air of said internal combustion engine; pressurizing a fluid to produce pressurized fluid; heating said pressurized fluid with waste heat from said internal combustion engine to produce supercritical fluid; and, injecting said supercritical fluid into one or more cylinders of said engine such that the fluid flashes into a vapor thereby providing power to said one or more cylinders during a power stroke of said one or more cylinders.

An embodiment of the invention may therefore further comprise a turbocharged engine system, comprising: a turbocharger comprising a turbine and a compressor;

a tank to hold water; a pump to pressurize water from said tank thereby producing pressurized water; one or more heat exchangers to, using heat produced by the engine system, heat said pressurized water to a supercritical state thereby producing supercritical water; and, an injector to inject said supercritical water into a cylinder of the engine system at a timing corresponding to combustion in said cylinder, so that said water provides additional power to said cylinder during a power stroke of said cylinder.

DETAILED DESCRIPTION OF THE EMBODIMENTS

Figure 1:
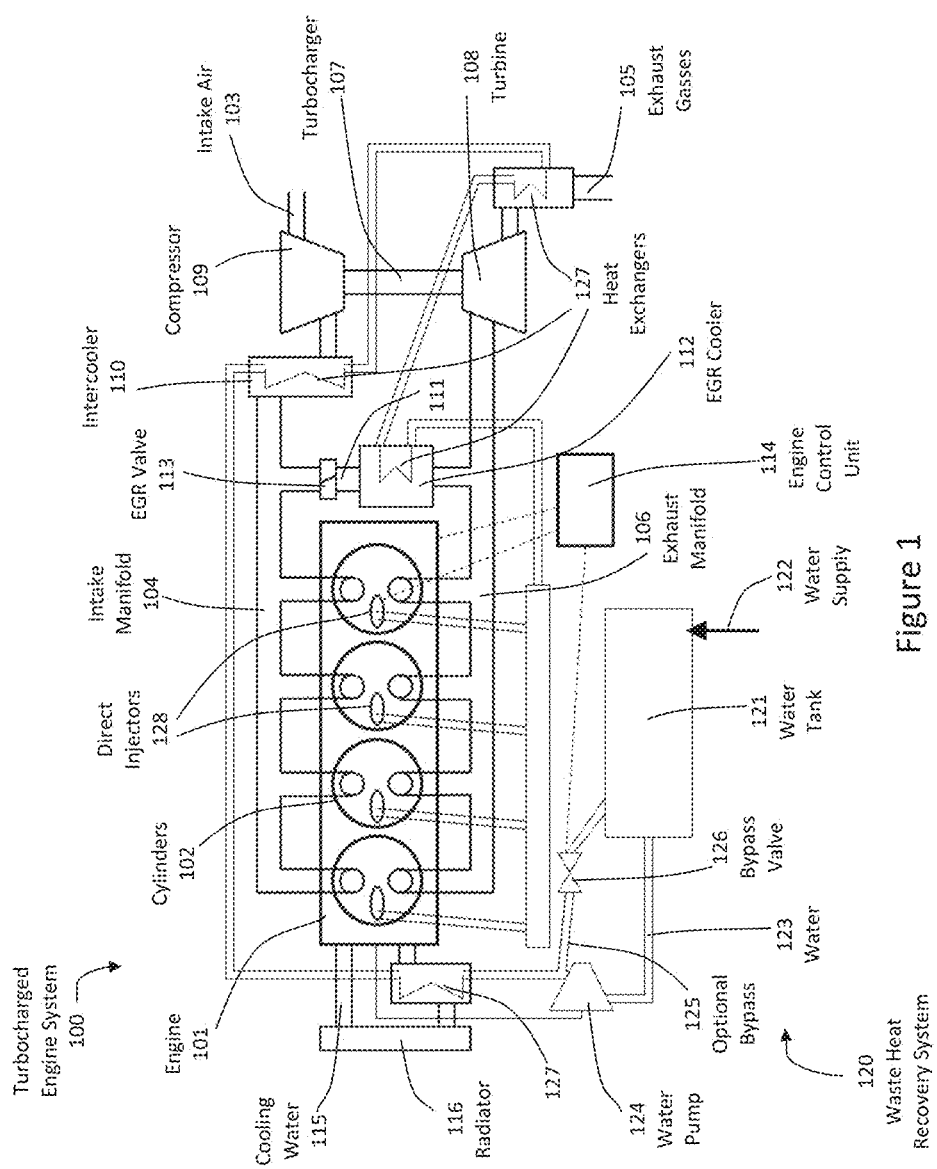
FIG. 1 is an illustration depicting a waste heat recovery system.

An embodiment uses the pistons of the engine as the expander for the waste-heat recovery system, where the working fluid is supercritical water or steam that is injected into the cylinders. In this embodiment, a separate mechanical expander is not needed. The system can simultaneously be used to reduce NOx emissions by acting as a moderator during combustion in the cylinders.

In an embodiment, a turbocharged internal combustion piston engine system includes a waste-heat recovery system. This system injects heated water into the cylinders during combustion to increase engine power and efficiency, and to reduce emissions. The engine can be a spark or compression ignition type of engine. The engine can utilize fuels including, but not limited to, diesel, natural gas, gasoline, and ethanol. The engine can also include a turbocharger that utilizes a turbine in the exhaust gas flow to provide power to a compressor in the intake air flow that pressurizes the intake air and provides additional charge flow to the engine to thereby increase engine output.

The waste-heat recovery system comprises a water supply, a high pressure pump, one or more heat exchangers that capture waste heat from the engine, and electronically controlled cylinder direct injectors that inject the pressurized and heated water into the engine cylinders with a timing that corresponds to the combustion of the fuel in the cylinders. In the case of a stationary engine, such as in a generator set, the water source may be a filtered water supply. The water source may be from a tank that is refilled periodically, much like a fuel tank in an on-road vehicle. Since water is a product of combustion, The water source may be water condensed out of the exhaust gas flow. The water source may be a combination of two or more of the aforementioned water sources.

In an embodiment, the high pressure water pump can be a positive displacement pump driven by the engine. The high pressure pump receives water from the water source and pressurizes it to a high pressure. For example, the water may be pressurized to a pressure that is in the range of 200+ bar. The water is then passed through one or more heat exchangers to heat the water with engine waste heat sources. Examples of waste heat sources that can be used to heat the water include: (1) the engine cooling water before it reaches the radiator; (2) exhaust gas after it has passed through a turbine; (3) exhaust after emissions after-treatment that requires high temperatures; (4) an intercooler; (5) an EGR cooler; and any other sources of waste heat.

Once the pressurized water is heated, it can be then distributed to the injectors in each cylinder through a rail-like bank. This rail-like bank can be much like in a common rail diesel fuel injection system. The injectors receive electrical signals from an engine controller to inject the high-enthalpy water during the end of the compression stroke and the beginning of the power stroke. In an embodiment, this is when combustion in the cylinder occurs. When injected, the water flashes into steam when it reaches the lower pressure of the cylinder. When the water flashes into steam it expands to help push the piston down during the power stroke thereby providing additional power to the engine. The injected water also acts as a moderator in the cylinder that absorbs heat from the combustion. This helps to keep cylinder temperatures lower thereby helping to reduce NOx emissions as well as reducing heat transfer to the cylinder walls. Additionally, when the water is injected toward the end of the compression stroke in spark ignition engines (such as gasoline and natural gas engines) the moderating effect may reduce the potential of detonation of the charge and engine knock.

FIG. 1 is an illustration depicting a waste heat recovery system. A turbocharged engine system 100 is shown in FIG. 1. The engine 101 may run on a variety of fuels. For example, the engine 101 may run on diesel, natural gas, or gasoline. The engine 101 may utilize spark or compression ignition. Engine 101 comprises one or more cylinders 102. Cylinders 102 are supplied with intake air 103 from an intake manifold 104. Cylinders 102 expel exhaust gasses 105 into exhaust manifold 106. Turbocharger 107 is positioned so that exhaust gasses 105 drive turbine 108. Turbine 108 is connected to drive compressor 109. Compressor 109 compresses intake air 103 to supply additional air flow to engine cylinders 102. In FIG. 1, after passing through compressor 109, intake air 103 passes through an intercooler 110 to cool the air temperature of intake air 103 and thereby making intake air 103 more dense. In some embodiments, EGR passage 111 connects exhaust manifold 106 to intake manifold 104. An EGR cooler 112 and EGR valve 113 can control and cool a flow of exhaust gasses 105 that are mixed with intake air 103. This mixture can reduce in-cylinder emissions.

In FIG. 1, waste-heat recovery system 120 comprises water tank 121. Water tank 121 can be filled by water supply 122. Water supply 122 can be one or more of: (1) a plumbed water connection for a stationary engine; (2) an amount of water that is refilled at certain intervals; and/or, (3), water condensed out of the exhaust gasses 105. Water tank 121 supplies water 123 to a high pressure water pump 124. Water pump 124 increases the pressure of the water 123 to a high level. This high level is sufficiently high that the water 123 becomes supercritical as it is later heated. When it is heated sufficiently, the state of the water 123 passes over the vapor dome.

The water pressure should be high enough to supply the discrete injections into the cylinders in a short amount of time. Pressurizing the water 123 to the point where it becomes supercritical when heated also has the advantage of avoiding multi-phase flow through the heat exchangers and injectors that would otherwise be present if the water 123 was at a lower pressure and passed through the vapor dome upon heating. High pressure water pump 124 can be, for example, a dedicated pump driven by the engine 101, or it can be integrated into an existing pump—such as a high pressure diesel fuel pump, if present.

Waste heat recovery system 120 can also be equipped with an optional bypass 125. Bypass valve 126 (controlled by engine control unit 114) can cause the water 123 from the high pressure water pump 124 to be returned back to the water tank 121 via bypass 125. This can be useful for periods of operation such as engine warm-up, when there is not yet enough heat generated by the engine to sufficiently heat the water 123, and it is advantageous to effectively idle the waste-heat recovery system 120 thereby decreasing the power required by the high pressure water pump 124.

Once the water 123 is pressurized, it travels through one or more heat exchangers 127 that heat the water with waste heat sources from the engine. These can include, but are not limited to, cooling water 115 of engine 101, exhaust gasses 105 of engine 101, intercooler 110, and/or EGR cooler 112, if present. If exhaust gasses 105 of engine 101 are used to heat water 123, the exhaust temperature may be lowered sufficiently to condense water out of the exhaust to be at least a part of water supply 122 of waste-heat recovery system 120. In an embodiment, water 123 should be heated by exhaust gasses 105 post turbine 108, so that energy is not removed from exhaust gasses 105 before turbine 108, thereby decreasing the power of turbine 108 and negatively affecting the performance of turbocharger 107. One exception may be for a high powered gasoline engine. In a high powered gasoline engine, exhaust gasses 105 should be cooled before entering turbine 108. This helps turbine 108 from being damaged by excessively high temperatures.

In an embodiment, water 123 should be heated by cooling water 115 at water 115's hottest point to both provide as much enthalpy as possible to water 123, as well as to decrease a heat rejection requirement of radiator 116. This hottest point is typically between engine 101 and radiator 116. In an embodiment, all parts containing heated water 123 should be insulated to avoid losing enthalpy through heat transfer to the ambient environment before the water 123 is injected. A desired effect of this heating process is to provide enough enthalpy to the water 123 to make it supercritical, or a gas beyond the vapor dome, so that when water 123 is injected into a cylinder 102, water 123 flashes to a vapor state in the cylinder 102.

At some engine operating conditions, such as idle or low load, there may not be enough waste heat to heat the water 123 to the desired level. In these cases, in an embodiment, water 123 may be sprayed on a hot piston inside engine cylinder 102 and thus evaporated inside cylinder 102. In another embodiment, water 123 may be heated by the pressurized charge in the cylinder to similarly become a vapor. Otherwise, waste-heat recovery system 120 can be idled by opening bypass valve 126 and turning off direct injectors 128.

Once water 123 has been heated to a high-enthalpy state, it is injected directly into each cylinder 102. This can be done through a dedicated direct injector 128. In an embodiment, if an injector for fuel, such as in a direct injection gas or diesel engine, is present, a parallel passage in a fuel injector may be used to inject water 123 simultaneously with the fuel. Engine control unit 114 operates the opening of the direct injectors 128 so that water 123 is injected at the end of the compression stroke. This avoids compression work on the piston due to the additional mass of water 123 in cylinder 102. With sufficient pressure, a desired quantity of water 123 can be injected in a short amount of time. This amount of time is similar to the duration necessary for direct injection of diesel fuel in a direct injection diesel engine.

In this way, high-enthalpy water injection acts much like a steam engine: water 123 expands in the cylinder when it flashes to a lower pressure through the injector 128. This steam engine type cycle happens simultaneously to the regular combustion cycle, thereby enhancing the power stroke. At the same time, the additional mass provided by water 123 is at a substantially lower temperature than the combustion products, so water 123 absorbs heat from the combustion process. This can additionally help the overall engine system by reducing NOx emissions, and reducing heat transfer to the cooling system through the cylinder 102.

In many engines, including diesel and natural gas engines, exhaust gas recirculation, or EGR, is employed to achieve similar effects of cooling the combustion gasses. Water is one of the major components of recirculated exhaust gas, so when water 123 is injected into cylinder 102, water 123 will have a similar effect as the recirculated exhaust gas. Injecting water 123 into cylinder 102 can be used with or without EGR. The water 123 injection provides a benefit over EGR by reducing the pumping work of the engine 101. The pumping work of engine 101 is reduces because engine 101 does not need to compress the mass of water 123 during the compression stroke because water 123 is injected largely after the compression stroke. For spark ignition engines, such as gasoline or natural gas engines, water 123 injections may also help to prevent knock in the cylinders by cooling and diluting the compressed charge toward the end of the compression stroke.

Figure 2:
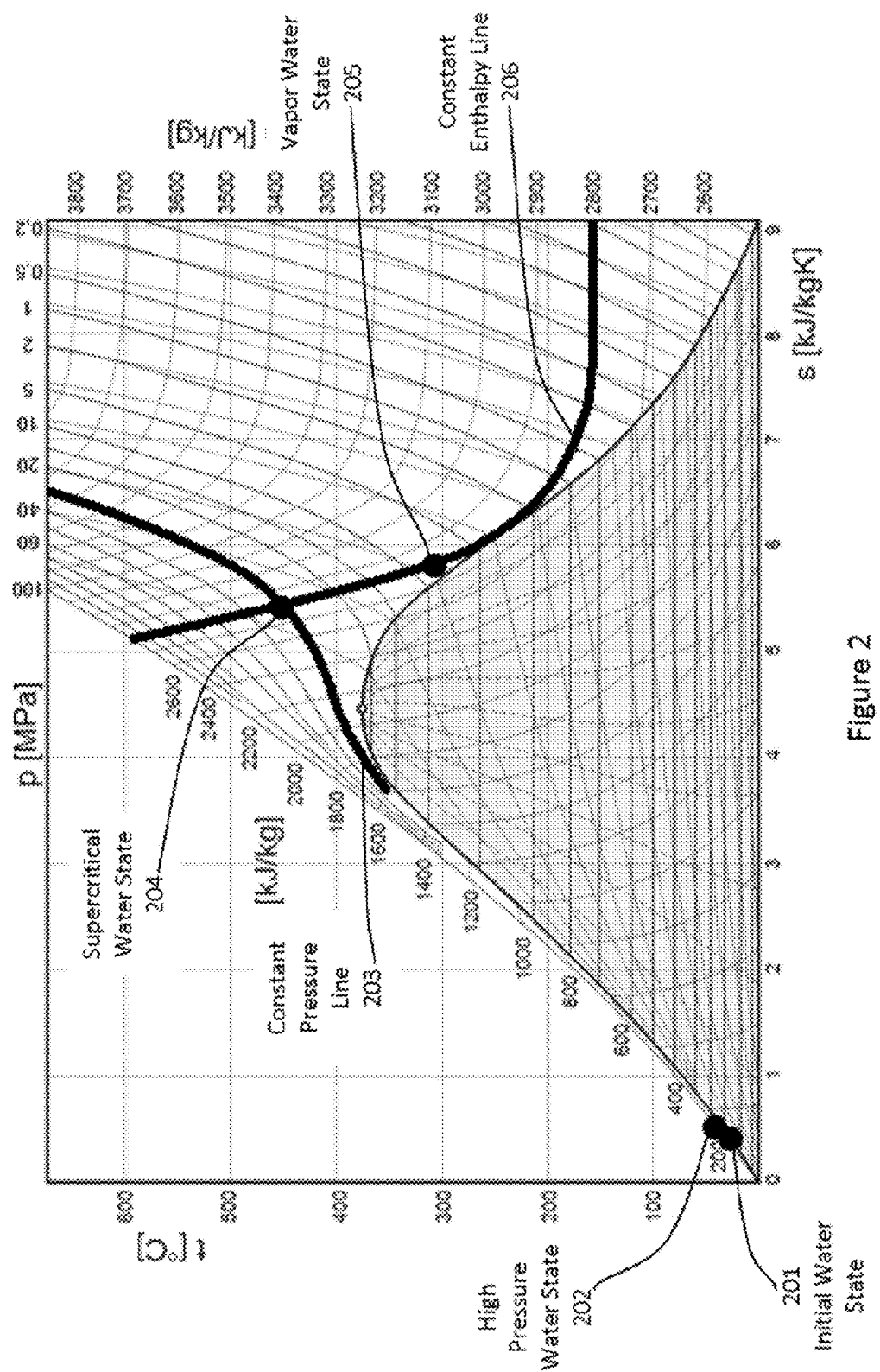
FIG. 2 is a plot of a T-s diagram for water illustrating the physical states water takes as it is heated and injected into the cylinders.

FIG. 2 is a plot of a T-s diagram for water illustrating the physical states water takes as it is heated and injected into the cylinders. In FIG. 2, point 201 is the initial state of water 123 at atmospheric pressure and ambient temperature. Water 123 is then compressed by high pressure water pump 124 to state shown at point 202. Next, water 123 travels up a constant pressure line 203 as water 123 is heated to a supercritical state at point 204. Finally, water 123 is injected into cylinder 102, where water 123 flashes into vapor state at point 205 by traveling down constant enthalpy line 206.

Figure 3:
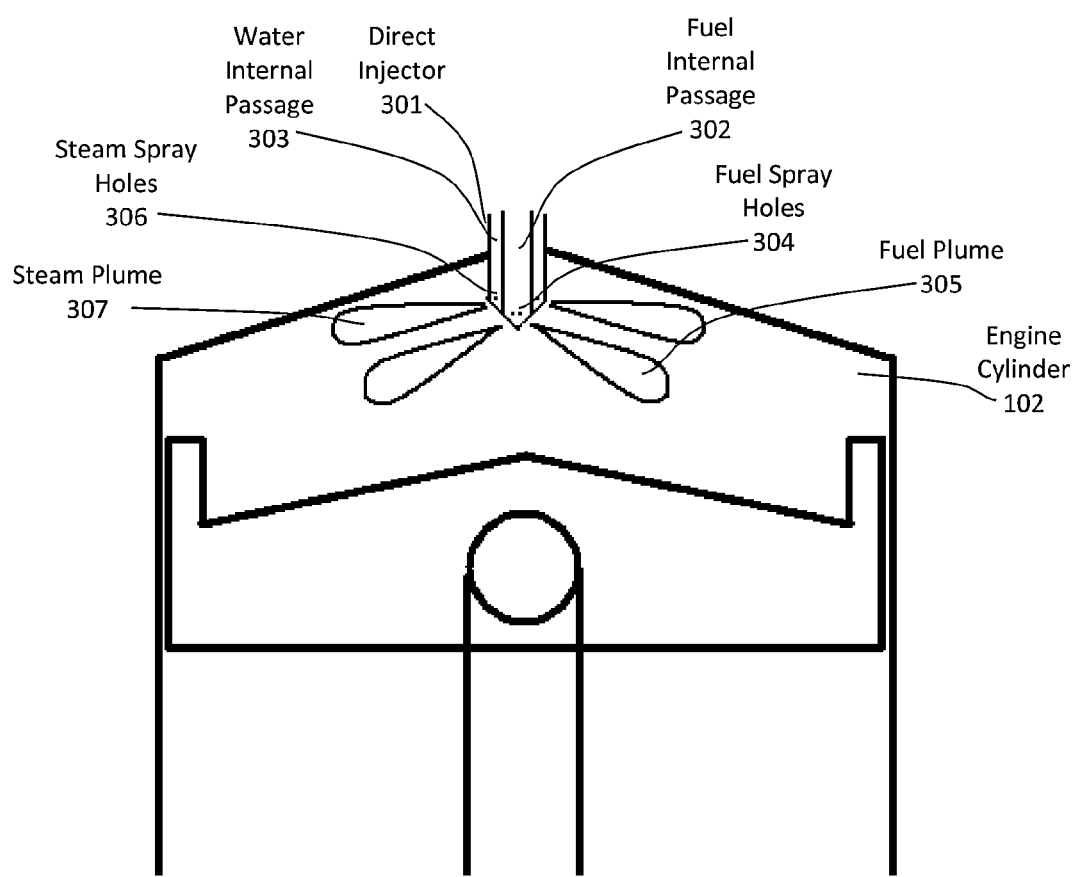
FIG. 3 illustrates a direct injector that injects both fuel and steam into the engine cylinders.

FIG. 3 illustrates a direct injector that injects both fuel and steam into the engine cylinders. In FIG. 3, direct injector 301 injects both fuel and steam directly into cylinder 102. Injector 301 has separated internal passages: a fuel internal passage 302, and a water internal passage 303. When the injector 301 opens, fuel is injected through fuel spray holes 304 into fuel plume 305, and heated water is injected through steam spray holes 306 into steam plume 307.

It should be understood that the system described here for high-enthalpy, in-cylinder water injection can be used as an addition to diesel, gasoline, natural gas, or other internal combustion, turbocharged, piston engines to produce more engine work through waste-heat recovery, as well as moderating combustion to reduce emissions and heat transfer. The system provides benefits over existing methods by utilizing an engine's pistons to extract energy through the waste-heat process, instead of needing a separate, external device to extract this energy. The high cylinder pressures present during combustion also allow for a greater expansion of the waste-heat cycle than can be utilized in most single stage, external system—such as turbines in an external Rankine cycle. This improves the efficiency of the waste-heat recovery system. In this way, high-enthalpy water injection is a pseudo-Rankine cycle, where the piston is used as the expansion device to extract work. It also provides benefits over an EGR system for cooling the combustion products in that the moderating fluid does not need to be compressed by the cylinder during the compression stroke (as is done in an EGR-only system), and improves breathing of the engine, as the additional mass of the recirculated gasses does not flow through the intake valves. The injected water may also be used to suppress engine knock and detonation in spark ignition engines.

It should also be understood that a waste-heat recovery system to a turbocharged internal combustion piston engine that also can reduce NOx emissions is provided. This system can be added to spark or compression ignition engines. This system can be used by engines burning fuels that include diesel, natural gas, and gasoline. A waste-heat recovery system involves heating high pressure water with one or more waste heat sources of the engine including engine coolant, exhaust gas, intercooler, and/or EGR cooler if present. High enthalpy water is then distributed to direct, in-cylinder injectors in each of the engine cylinders where it is injected into the cylinder at a time corresponding to combustion in each cylinder. The high-enthalpy water flashes into steam, providing additional power to the engine, as well as acting as a moderating fluid to absorb combustion heat and reduce NOx emissions.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A waste heat recovery system for a turbocharged engine, comprising:
   an internal combustion engine with one or more cylinders, the internal combustion engine to receive intake air and produce an exhaust gas flow of exhaust gasses;
   a turbocharger that extracts energy from the exhaust gas flow and compresses the intake air;
   a water source that receives water condensed out of the exhaust gas flow;
   a pump to pressurize the water condensed out of the exhaust gas flow;
   one or more heat exchangers to heat said water using waste heat from said internal combustion engine; and,
   one or more electronically controlled direct injectors to inject fuel and said water that has been pressurized and heated into at least one engine cylinder of said internal combustion engine where said water and said fuel are injected independently through separate passages in said direct injectors.

2. The waste heat recovery system of claim 1, wherein said water is injected into said at least one engine cylinder at the end of a compression stroke of said at least one engine cylinder.

3. The waste heat recovery system of claim 1, wherein said water injected into said at least one cylinder is pressurized and heated to a supercritical state.

4. The waste heat recovery system of claim 3, wherein said waste heat from said internal combustion engine is from cooling water and exhaust gasses downstream of a turbine of said turbocharger of said internal combustion engine.

5. The waste heat recovery system of claim 4, wherein said waste heat from said internal combustion engine is additionally from an EGR cooler of said internal combustion engine.

6. A method of recovering waste heat for a turbocharged engine, comprising:
   providing an internal combustion engine with one or more cylinders, the internal combustion engine to receive intake air and produce an exhaust gas flow of exhaust gasses;
   providing a turbocharger that extracts energy from the exhaust gas flow and compresses intake air;
   providing a water reservoir;
   pressurizing water from said water reservoir to produce pressurized water;
   heating said pressurized water with waste heat from said internal combustion engine to produce supercritical water;
   providing one or more electronically controlled direct injectors that inject fuel and said supercritical water independently through separate passages in said direct injectors into one or more cylinders of said engine; and,
   injecting said supercritical water into one or more cylinders of said engine such that said water flashes into a vapor thereby providing power to said one or more cylinders during a power stroke of said one or more cylinders.

7. The method of claim 6, wherein water is condensed out of the exhaust gas flow and supplied to said water reservoir.

8. The method of claim 7, wherein the water reservoir is supplied water from a filtered water supply.

9. The method of claim 6, wherein the water reservoir comprises a refillable tank.

10. The method of claim 9, wherein the water reservoir is additionally supplied water condensed out of said exhaust gas flow.

11. The method of claim 6, wherein said pressurized water is heated by engine coolant and engine exhaust gasses downstream of a turbine of said turbocharger.

12. The method of claim 6, wherein said water is injected into said one or more cylinders at the end of a compression stroke of said one or more cylinders.

13. The method of claim 6, wherein said water cools engine exhaust gasses prior to said engine exhaust gasses entering said turbocharger.

14. A turbocharged engine system, comprising:
a turbocharger comprising a turbine and a compressor, the turbine to be powered by an exhaust gas flow of exhaust gasses of the engine system, the compressor to compress intake air;
a tank to hold water, the tank to receive water that was condensed out of the exhaust gas flow of the engine system;
a pump to pressurize water from said tank thereby producing pressurized water;
one or more heat exchangers to, using heat produced by said engine system, heat said pressurized water to a supercritical state thereby producing supercritical water; and,
an injector to inject fuel and said supercritical water into a cylinder of said engine system at a timing corresponding to combustion in said cylinder, so that said water provides additional power to said cylinder during a power stroke of said cylinder, where said injector has separate passages to inject said fuel and said supercritical water independently.

15. The engine system of claim 14, wherein a first heat exchanger is an intercooler.

16. The engine system of claim 14, wherein said one or more heat exchangers utilize heat from engine coolant and exhaust gasses downstream from said turbine to heat said pressurized water.

17. The engine system of claim 16, further comprising:
a third heat exchanger to heat said pressurized water using heat from an EGR cooler.

18. The engine system of claim 14, further comprising:
a valve to recirculate said water from said pump back to said tank to prevent injection of said water into said cylinder of said engine system when heat produced by said engine system is insufficient to heat said pressurized water.

19. The engine system of claim 14, wherein said water injected into a cylinder of said engine system moderates combustion in said cylinder thereby reducing NOx production.

* * * * *